United States Patent [19]

Balliet et al.

[11] Patent Number: 4,545,074

[45] Date of Patent: Oct. 1, 1985

[54] FIBER OPTIC LOOP SYSTEM WITH BYPASS MODE

[75] Inventors: Layton Balliet; Richard A. Wantshouse; Thomas J. Wylie, all of Boca Raton, Fla.

[73] Assignee: International Business Machines Corporation, Armonk, N.Y.

[21] Appl. No.: 436,166

[22] Filed: Oct. 22, 1982

[51] Int. Cl.⁴ ............................................. H04B 9/00
[52] U.S. Cl. .................................... 455/601; 455/607; 371/8
[58] Field of Search .............. 455/601, 606, 607, 612, 455/18, 21; 371/8; 375/3, 4

[56] References Cited

U.S. PATENT DOCUMENTS

| 3,652,867 | 3/1972 | Zinn | 307/86 |
|---|---|---|---|
| 3,870,396 | 3/1975 | Racki et al. | 350/96 WG |
| 3,870,398 | 3/1975 | Love | 350/96 C |
| 4,017,149 | 4/1977 | Kao | 350/96 C |
| 4,072,399 | 2/1978 | Love | 350/96.16 |
| 4,112,293 | 9/1978 | Käch | 455/601 |
| 4,144,414 | 3/1979 | Nicholas | 370/103 |
| 4,166,946 | 9/1979 | Chown et al. | 250/199 |

FOREIGN PATENT DOCUMENTS 57-20051 2/1982 Japan ........................................ 371/8

OTHER PUBLICATIONS

P. Abramson and F. E. Noel, "Fiber-optic Transmission System With Bypassable Repeaters", IBM Technical Disclosure Bulletin, vol. 25, No. 1, Jun. '82.

*Primary Examiner*—Robert L. Griffin
*Assistant Examiner*—Timothy K. Greer
*Attorney, Agent, or Firm*—James A. Kunkle

[57] ABSTRACT

An optical data is transmitted from station to station through an optical T-coupler attached to each station. The optical T-coupler splits the data signals into two paths with identical data being transmitted to the attached station and also the succeeding station. An optical to electronic conversion takes place as the data enters the station. Electronic digital switching within each station selects a "normal" mode of receiving data from the preceding station when data is valid or a "bypass" mode of receiving data from the station which precedes the preceding station. Switching from normal to bypass mode is performed by electronic switching and requires no optical switches.

3 Claims, 7 Drawing Figures

FIG. 6 DRIVER
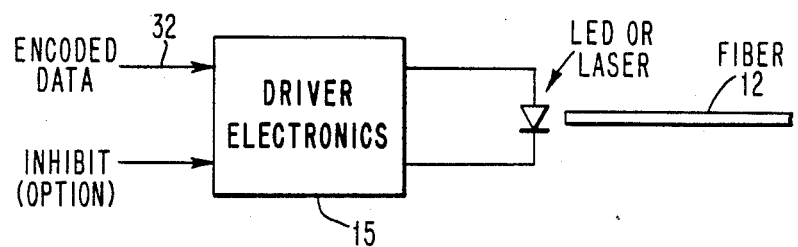
FIG. 7 STATION CONTROL LOGIC
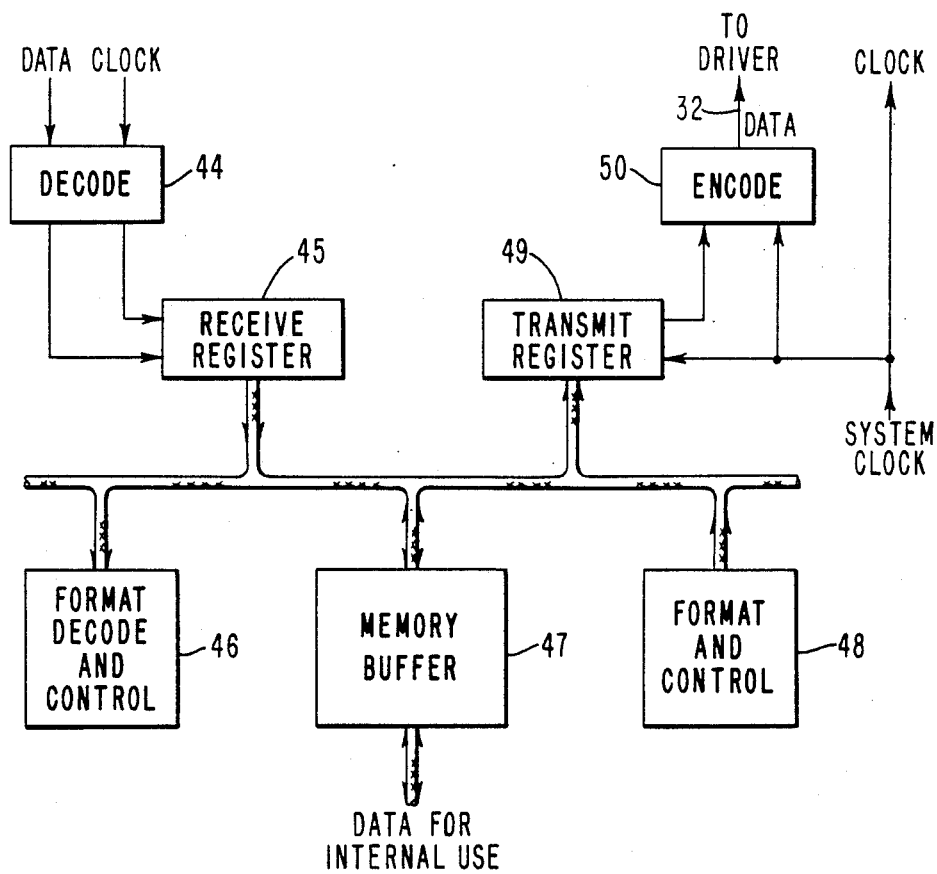

FIBER OPTIC LOOP SYSTEM WITH BYPASS MODE

DESCRIPTION

1. Technical Field

The invention relates to a system for transmitting optical digital data between stations connected in a loop configuration.

2. Background Art

Transmission of digital data in the optical mode by fiber lines is being used increasingly in industry because of many advantages, a few of which are less driving power and less transmission noise than electrical transmission. However, along with the advantages of transmitting data in the optical mode compared to the electrical mode the disadvantage has been that optical switching of data requires use of large, costly optical switches with inherent loss of speed in transmission time. Presently, any switching of data between stations or routing around stations requires use of optical switching and the introduction of these disadvantages.

Known prior art, e.g., U.S. Pat. No. 4,166,946 which transmits optical data with other than optical switching presents synchronization problems which are not present in the subject invention.

Other prior art of interest are U.S. Pat. Nos. 3,870,396; 3,870,398; 4,072,399 which describe optical coupler devices; 4,017,149 which describes a fiber optical bus communication system; and 3,652,867 which is representative of non-optical bypass devices.

DISCLOSURE OF THE INVENTION

The optical data transmission system of the present invention overcomes the disadvantages of optical data switching of systems known in the prior art by performing the data switching by electronic logic devices while allowing the optical data to move in a non-switching mode. Also the synchronization problems of the prior art are overcome since the present invention eliminates any need for re-combining or alignment of optical data.

The present invention transmits optical data between stations in a continuous mode without optical switching and performs a bypass of a selected station by switching from a first optical data path to a second optical data path by electronic logic switching devices. An optical T-coupler device at each station on a loop of stations splits an incoming optical signal from the preceding station into two paths with part of the signal entering the station attached to the T-coupler and the remaining part being transmitted to the following station on the loop. Through electronic digital logic in each station a decision is made to select data from either of the two optical data paths for entry into the station. Through this capability an effective bypassing of a station can be performed without physical switching of the optical signal.

BRIEF DESCRIPTION OF THE DRAWINGS

FIG. 6 shows the driver unit.

FIG. 7 is a block diagram of the station control logic.

BEST MODE FOR CARRYING OUT THE INVENTION

This invention relates to a loop digital transmission system between stations which may be data processors, controllers, terminals, etc. which are connected by a fiber optic cable attached to an optical T-coupler at each station. Each station has a station interface unit which includes two receivers, receiver A for input from its attached T-coupler and receiver B for input from the T-coupler at the preceding station. The T-coupler splits an incoming optic signal from a preceding station into two outgoing paths with one path entering a receiver at the attached station and the other path going to a receiver at the next succeeding station. By logically gating which one of two receivers at a station will be active, either a normal mode or a bypass mode can be selected based on the validity of signals received by a station.

Figure 1:
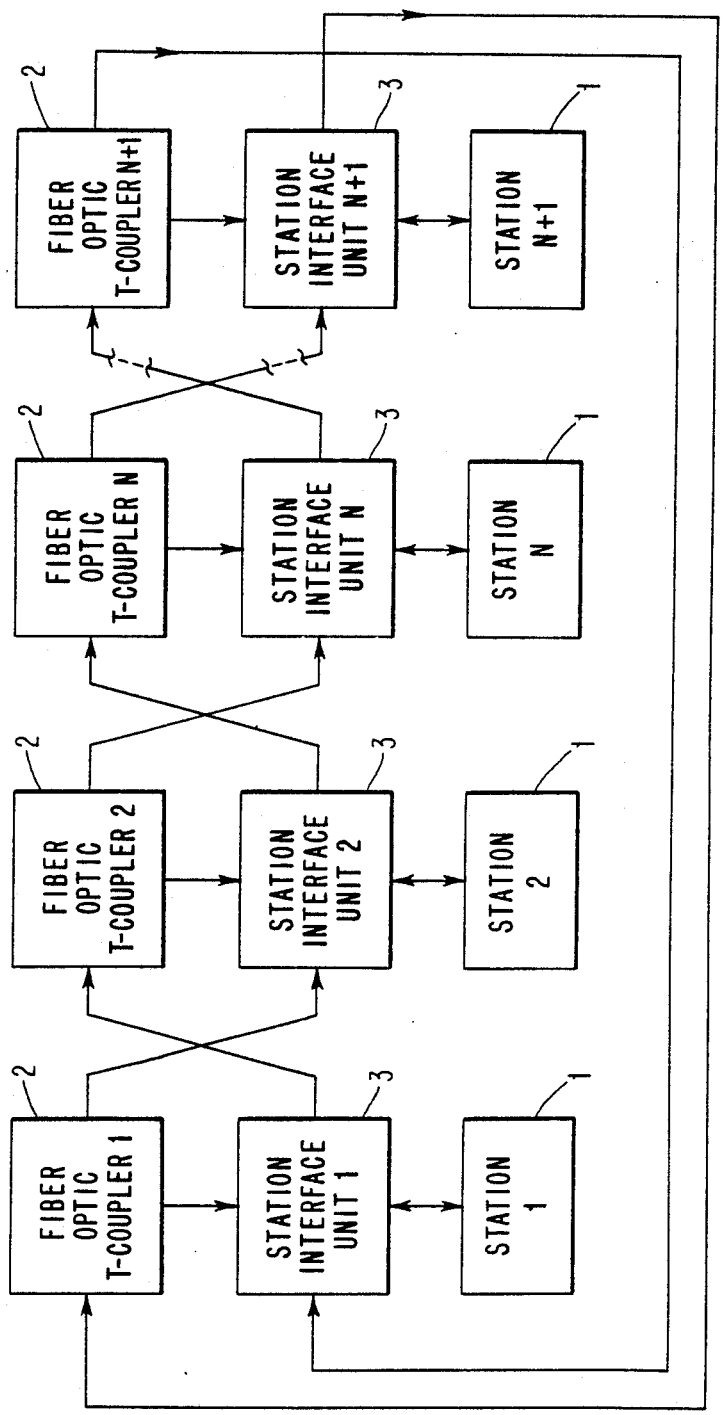
FIG. 1 shows the complete loop system in block diagram form.

The loop transmission system described herein and shown in FIG. 1 consists of multiple stations 1 connected in a loop configuration by a fiber optical cable attached to a T-coupler 2 at each station.

Figure 2:
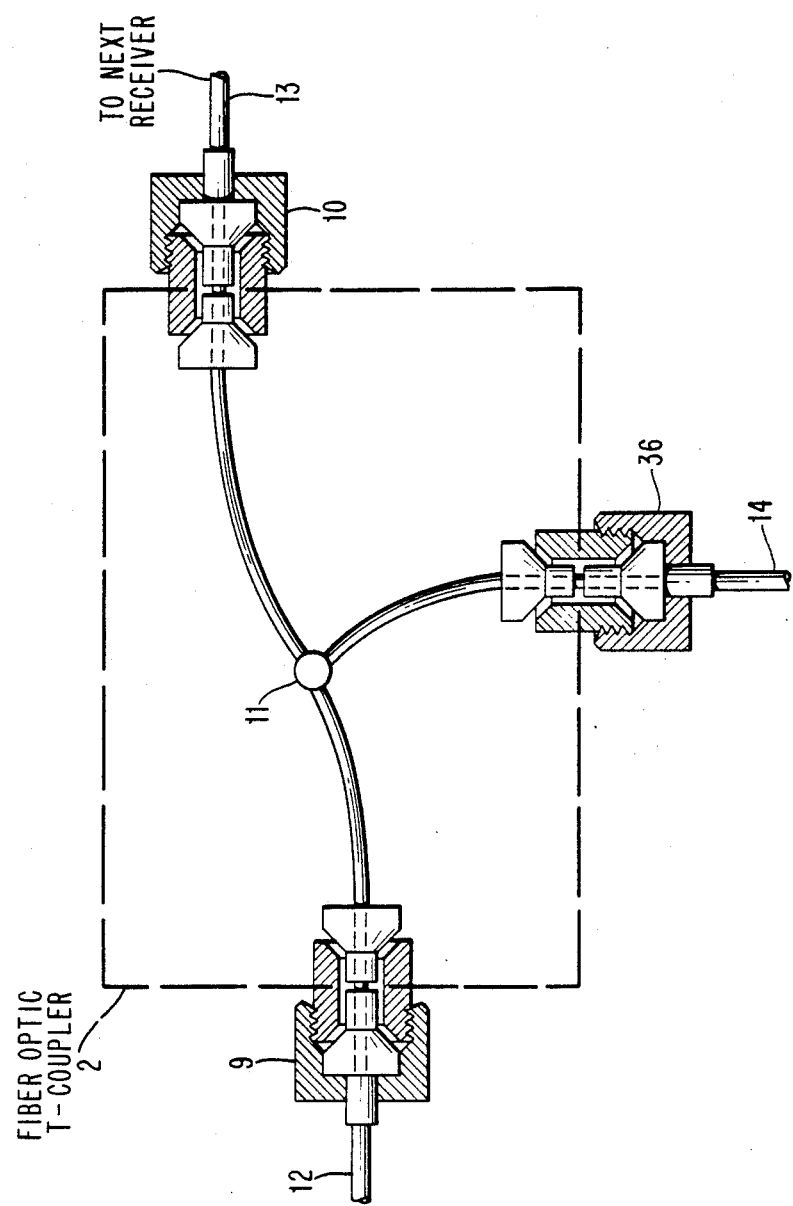
FIG. 2 shows the T-coupler apparatus.

The T-coupler as shown in FIG. 2 receives an optical signal on a dual fiber cable 12 into connector 9. Connector 9 directs the optical signal to a fused function point 11 where the signal is split into two paths. One path is directed to connector 10 which exits the signal onto line 13 and the other path is directed to connector 36 which exits the signal onto line 14.

Figure 3:
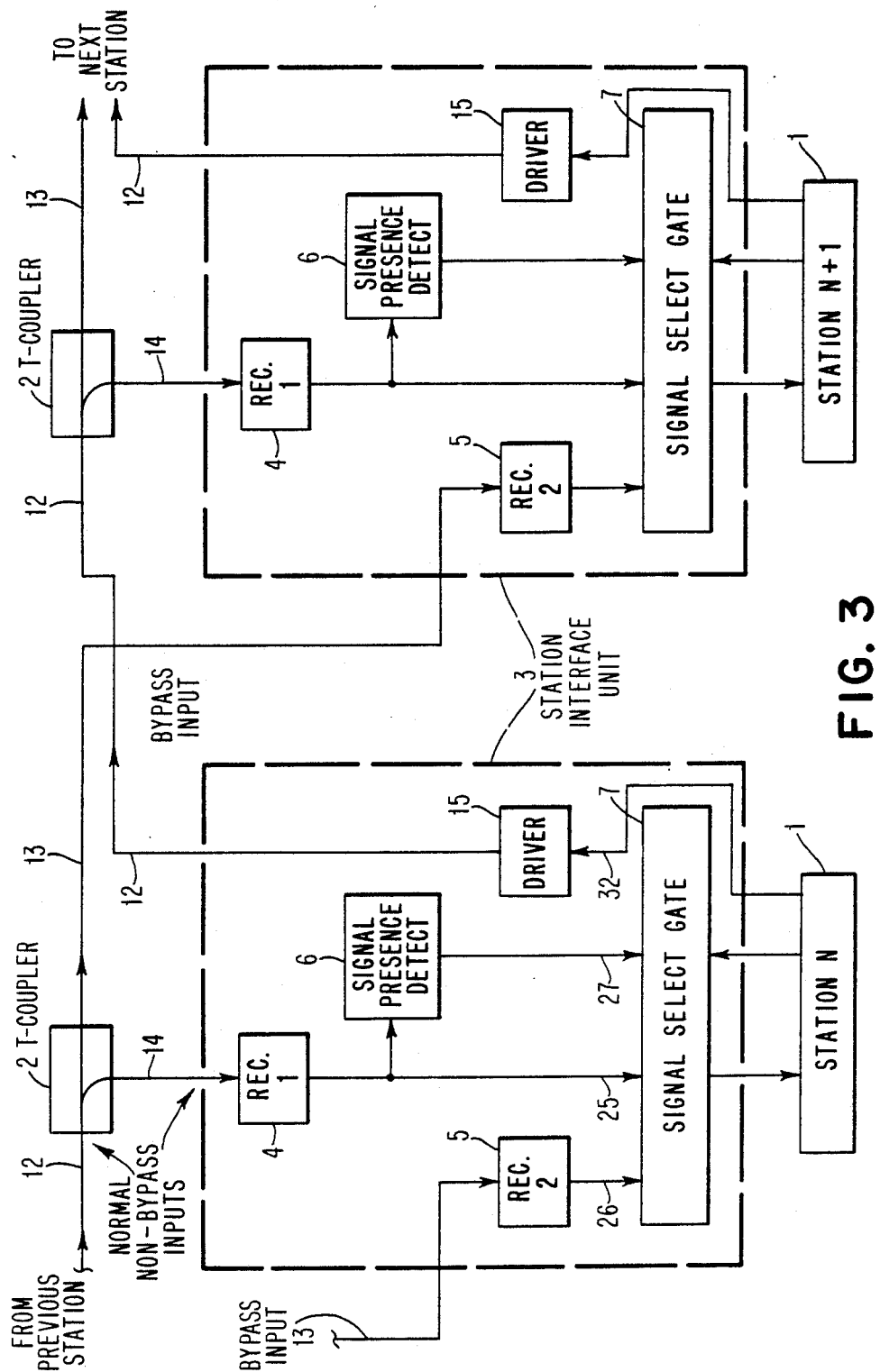
FIG. 3 is a block diagram of two stations on the optical transmission loop.
Figure 4:
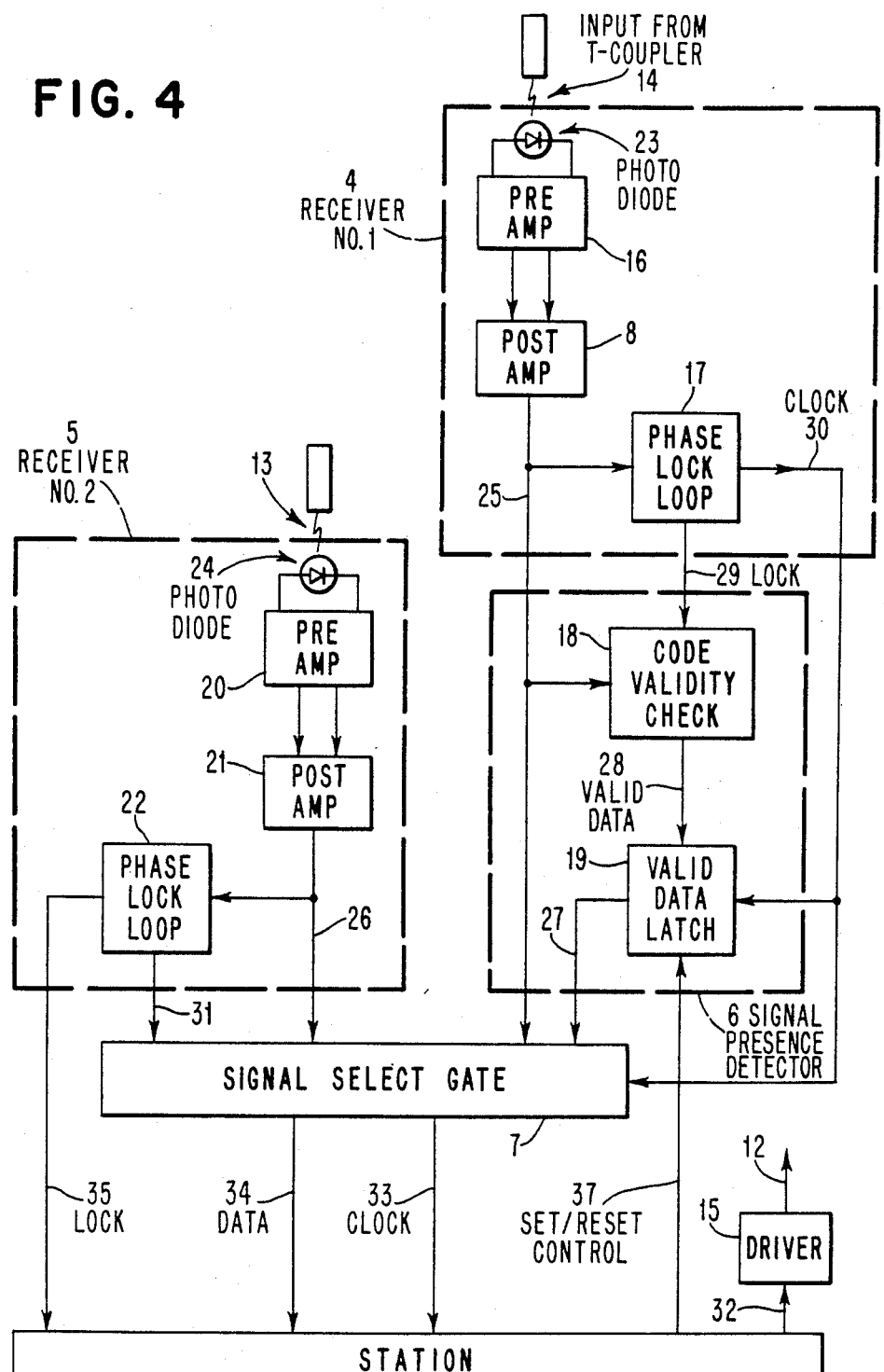
FIG. 4 is a diagram of the digital logic in the terminal for performing the validity check and receiving data.

Referring to FIG. 3, a station interface unit 3 receives digital optical signals from the attached T-coupler on line 14 into receiver A and also from the preceding station T-coupler on line 13 into receiver B on line 13. Referring to FIG. 4, the digital optical signals on line 14 are converted to an electrical digital signal by photodiode 23 and entered into pre-amp 16 of receiver A. From pre-amp 16 the electrical digital signal is again amplified in post-amp 8 before being placed on line 25.

Phase lock loop 17 generates a clock signal from the data input. Phase lock loop 17 also generates a lock signal 29 which indicates that the data is being acquired and tracking properly. The data being received can be encoded in any of the known transmissions codes such as bi-phase (Manchester 2), or other more sophisticated codes which have parity bits assigned in accordance with a predetermined algorithm. Data on line 25 is shifted into a code validity check unit 18 of the signal presence detector 6 which examines the code as well as the state of the lock signal 29 and produces a signal on the valid data line 28. The signal on line 28 is a positive one if the validity check shows that the data is valid and a zero level if the validity check shows that the data is invalid. The valid data latch 19 receives the input from line 28 and latches the validity condition on/off. This validity condition is directed to the signal select gate 7 by way of line 27.

The station interface unit 3 receives digital optical signals into receiver B on line 13 from the T-coupler at the preceding station on the loop. The signals are converted to electrical digital signals by photodiode 24 and entered into pre-amp 20 and onto post amp 21 and then to line 26 for entering to phase lock loop 22 and signal select gate 7 in the same manner as performed by pre-amp 16 and post amp 8.

Digital output data from the station is sent on line 32 to driver 15 where the data undergoes a conversion from the electrical to the optical state for transmission on line 12 to the next succeeding station T-coupler.

The signal select gate 7 receives clock inputs from receiver A on line 30 and line 31 and receives data input from receiver A on line 25 and receiver B on line 26. Based on the state of line 27 from valid data latch 19 the signal select gate 7 will make a logic decision to allow data to enter the attached station 1 from either receiver A when the data is valid on line 25 or from receiver B when the data is invalid on line 25.

Figure 5:
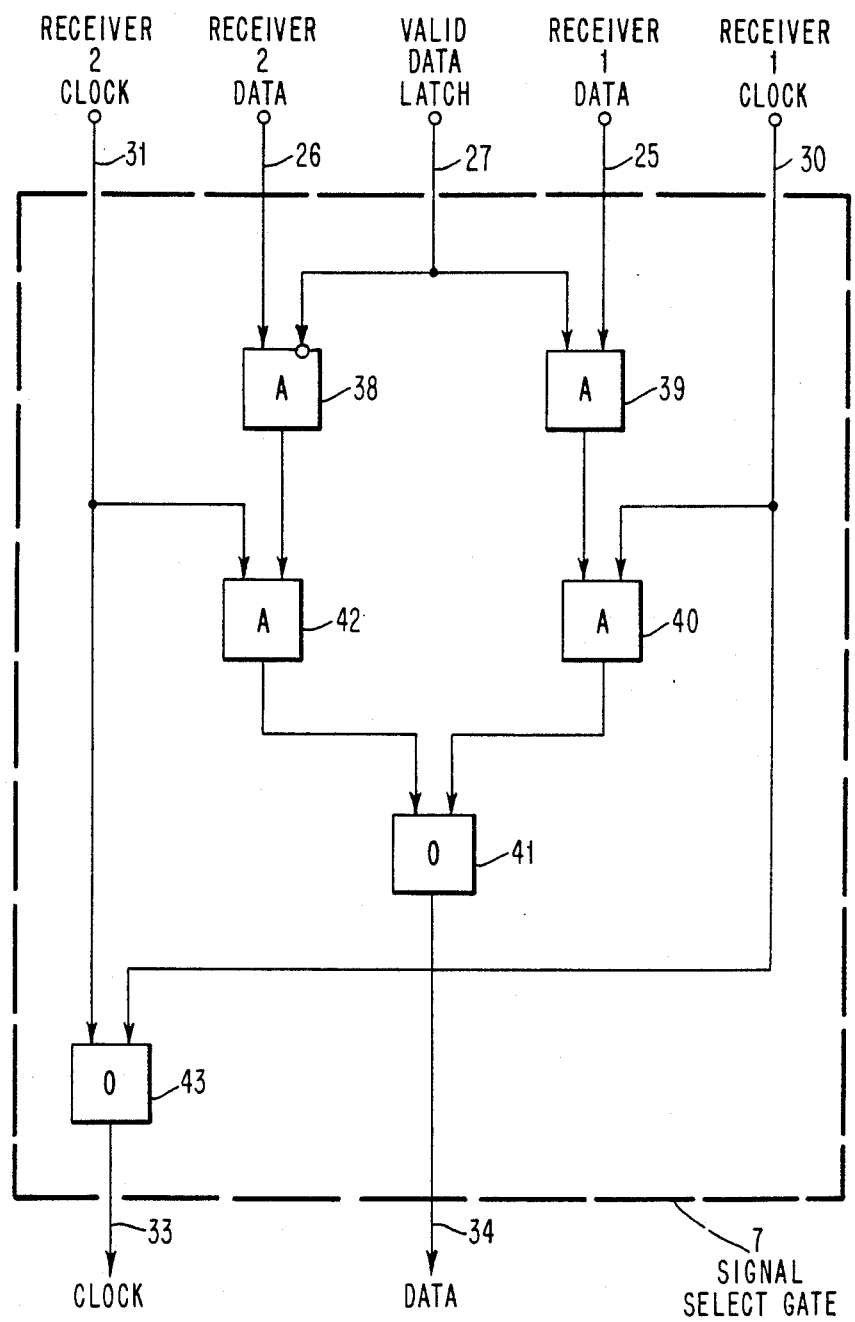
FIG. 5 is a diagram of the signal select gate unit logic for switching to and from the bypass mode.

The signal select gate 7 as shown in FIG. 5 performs the receiver switching function. Valid data latch line 27 being positive will activate AND gate 39 to data on line 25 from receiver A and deactivate AND gate 38 through the negative terminal to block data from receiver B.

Line 37 from the station to the valid data latch 19 gives the station the option to override normal data selection for testing purposes.

The driver unit as shown in FIG. 6 converts the encoded digital electronic output from the station into optical data by intensity modulation of an LED or laser diode which interfaces with an optical fiber for transmission of the data to the following station.

The station control logic shown in FIG. 7 performs the data receive and transmit function in the station. Data is received from the signal select gate 7 on line 34 into decode 44 which shifts the decode output to receive register 45 for entry into the station internal data flow controlled by format decode and control 46, memory buffer 47 and format and control 48. Data output from the station is performed by transmit register 49 and encode 50 which place data on line 32 which is transmitted to driver 15.

OPERATION IN "NORMAL" MODE

Optical data arrives from the preceding station on fiber optic line 12 into optical coupler 2 through connector 9 to junction 11 where the optical data is split into two paths with one path going to connector 10 onto line 13, and the other path going to connector 36 onto line 14.

On line 14 the optical data is sent to receiver A in the attached interface unit 3. At photo diode 23 the optical data is converted to electronic digital data and amplified by pre-amp 16 and post-amp 8 onto line 25. From line 25 the digital data enters phase lock loop 17, code validity check 18 and signal select gate 7. In unit 17 a clock signal is generated onto line 30 and a lock signal on line 29 which indicates the data has been acquired and is tracking properly. In unit 18 the data is checked for validity and also that the lock signal is present. Since the data is valid and properly locked, a signal is sent on line 28 to valid data latch 19 turning the latch on. Latch 19 being on raises line 27 to a positive level into signal select gate 7. The digital data on line 25 also enters signal select gate 7. In unit 7 this data enters AND gate 39 along with a positive level on line 27 from the valid data latch 19. Data passes through AND gate 39 into AND gate 40 where it combines with the clock 30 for input into OR gate 41 and subsequent output on line 34 into the attached station 1. In signal select gate 7, line 27 from the valid data latch is applied to the negative input terminal of AND gate 38 and since the level of line 27 is positive, output from AND gate 38 is cut off, thus cutting off input from receiver B into the terminal. Therefore in the "normal" mode, data enters the terminal from the preceding station through receiver A.

OPERATION IN THE "BYPASS" MODE

Optical data arrives from the preceding station as described in the "normal" mode operation however, if in code validity check 18, the data is found invalid or the lock signal on line 29 is not present, this prevents an output on line 28 from turning valid data latch 19 on, thus line 27 is negative. Line 27 being negative cuts off the flow of data into the station through AND gate 39. Line 27 being negative allows data on line 26 from receiver B to enter the terminal through AND gate 38, AND gate 42 and OR gate 41 and line 34. Data enters receiver B from the station prior on the loop to the preceding station through line 12, optical T-coupler 2, line 13, photo diode 24 where the data is converted from optical to digital, through pre-amp 20, post-amp 21, onto line 26 into AND gate 38. Therefore in the "bypass" mode, data enters the terminal from the station prior to the preceding station through receiver B.

Whereas we have illustrated and described the preferred embodiment of our invention to the precise construction herein disclosed and the right is reserved to all changes and modifications coming within the scope of the invention as defined in the appended claims.

We claim:

1. A fiber optic data transmission system having at least three stations connected in a loop with each station comprising:
   an optical T-coupler;
   a station interface unit including a first receiver and a second receiver;
   a station control logic unit having:
   a decode unit connected to said first receiver and said second receiver through a signal select gate,
   a receive register connected to said decode unit,
   a format decode and control unit connected to said receive register,
   a memory buffer connected to said format decode and control unit and also to said receive register;
   said optical T-coupler providing separation of a digital optical input signal transmitted from the preceding station into two output paths one of which is directed to said first receiver within the attached station and the other of which is directed to said second receiver in the next succeeding station;
   said first receiver for accepting a digital optical signal from said optical T-coupler in the attached station and converting the signal into an electronic digital signal;
   said second receiver for accepting a digital signal from said optical T-coupler at the preceding station and converting the signal into an electronic digital signal;
   governing means at each station for effecting normal mode or bypass mode operation dependent upon the validity of the electronic digital signal at the output of its first receiver;
   said decode unit receiving bits of data in serial form from either said first receiver or from said second receiver providing a shifted bit output,
   said receive register receiving and holding said shifted bit output from said decode unit until an eight bit segment called a byte, is held, said byte including an address, said format decode and conrol unit examining said address of said byte of data in said receive register, and directing said byte of data to a particular address in said memory buffer, said memory buffer receiving said data bytes from said receive register said memory buffer also being able to store data generated internally in said station;

whereby data in said memory buffer contains either data received from a preceding station on said loop or data generated internally in said station.

2. A data transmission system according to claim 1 further including:

said station control logic having:

a format and control unit connected to said membory buffer, a transmit register connected to said memory buffer, an encode unit connected to said transmit register, a driver unit connected to said encode unit and also to said optical T-coupler in the next succeeding station, said format and control unit examining said address of a byte of data in a particular section of said memory buffer and directing said byte of data to said transmit register, said memory buffer sending said directed byte of data to said transmit register, said transmit register shifting said byte of data to said encode unit in serial bit form, said encode unit sending serial data to said driver unit, said driver unit transmitting data to said optical T coupler in the next succeeding station on said loop;

whereby data can be transmitted from said memory buffer during the condition of data not being received from either said first receiver or from said second receiver.

3. A data transmission system according to claim 2 whereby during the condition of being in the bypass mode and not receiving data from the station preceding the preceding station, data can be transmitted from said memory buffer containing data internally generated in said station.

* * * * *

UNITED STATES PATENT AND TRADEMARK OFFICE
CERTIFICATE OF CORRECTION

PATENT NO. : 4,545,074

DATED : October 1, 1985

INVENTOR(S) : Layton Balliet et al

It is certified that error appears in the above-identified patent and that said Letters Patent is hereby corrected as shown below:

Claim 1, line 54: After "digital" insert therefor --optical--.

Claim 2, line 17: Delete "membory" and insert therefor --memory--.

Signed and Sealed this

Twenty-first Day of January 1986

[SEAL]

Attest:

DONALD J. QUIGG

Attesting Officer

Commissioner of Patents and Trademarks